Feb. 5, 1935.  L. E. JONES  1,989,988
BRUSH MOUNTING
Filed Jan. 13, 1931

INVENTOR.
Lloyd. E. Jones.
BY Philip A. Minnis
ATTORNEY.

Patented Feb. 5, 1935

1,989,988

UNITED STATES PATENT OFFICE 1,989,988

BRUSH MOUNTING

Lloyd E. Jones, Santa Monica, Calif., assignor to Food Machinery Corporation, San Jose, Calif., a corporation of Delaware Application January 13, 1931, Serial No. 508,422

8 Claims. (Cl. 15—21)

This invention relates to brushing machinery and more particularly pertains to the type in general use today throughout the fruit packing industry for brushing fruit in order to clean or polish it. The invention broadly contemplates the construction of such a machine in which provision is made for rapidly and easily removing defective or worn brushes and replacing them with good ones.

The type of brushing apparatus referred to as in general use at the present time usually comprises a series of substantially cylindrical brushes, arranged in parallel relation and slightly spaced apart, thus providing fruit holding grooves or runways therebetween, so that the fruit is supported by the brushes and is thoroughly brushed thereby. In some cases the fruit is fed longitudinally of the brushes so as to pass down the runways between adjacent brushes, while in other cases the fruit is fed transversely across the brushes, being advanced, as is well known, by contact with oncoming fruit behind it. I have selected the latter of these types in order to illustrate my invention, but it will be understood that it is applicable to both types.

As will be understood, the large amount of fruit passing over the brushes results in considerable wear, so that their life is ordinarily comparatively short. Moreover, where the brushes are used in washers this wear is augmented by the action of moisture and acids used in the wash water, and in cases where they are used in polishing machines for imparting a polish to the fruit which has had a coating of wax applied thereto the polishing brushes soon become so gummed up with wax that their efficiency is materially impaired.

For these reasons it frequently becomes necessary to replace the brushes and it often happens that this is required during the period of operation of the machine, thus necessitating shutting down the machine while the repairs are being made. In machinery now in use the construction is such that the amount of time consumed in these shut downs for replacements is a source of constant annoyance and considerable loss to the operators and it is, therefore, the primary object of my invention to construct a brushing machine of the type referred to in which provision is made for permitting the ready removal of defective or worn brushes and allowing for rapid replacements with new ones.

In the embodiment herein disclosed this purpose is accomplished by providing brushing rollers without shafts or axles, substituting instead suitable recesses in their ends for the reception of stub shafts. A pair of these stub shafts is provided for each brush and one of them is rotatably secured in position in a bearing or shaft support and provided with driving means on its outer end, while its inner end is provided with means for engagement with the brush roller so that rotation of the shaft will cause rotation of the brush. In its preferred form this operating mechanism comprises a squared portion on the inner end of the shaft, which engages a squared recess in the end of the brush roller so that an operative engagement is provided while at the same time the brush is otherwise unsecured to the shaft and may be readily withdrawn when desired. The other stub shaft is slidably mounted in its shaft support so that it may be thrust into the recess in the opposite end of the brush roller and means are provided for quickly clamping it into position. By loosening the clamping means the shaft may be withdrawn, thus releasing the roller which may thereupon be removed from the driving shaft and a new roller substituted therefor.

It is also an object of the invention to provide a brush adapted for use in machines of the class described in which the brush core is provided with removable end caps for the reception of the supporting shafts, whereby when it is necessary to discard the brush, the end pieces may be detached and applied to new brush cores. The brush cores are ordinarily made of wood and it is, therefore, necessary to provide their ends with stronger means for receiving the supporting and driving shafts in order to retard wear. These reinforcing means may take the form of metallic end caps provided with bearings for the reception of the shafts, and since the provision of such caps materially adds to the cost of the brush, a considerable saving may be effected by making the caps removable, whereby they may be applied to new cores.

A clearer understanding may be had by reference to the accompanying drawing, in which like parts are indicated by like reference characters throughout the several views.

Figure 1:
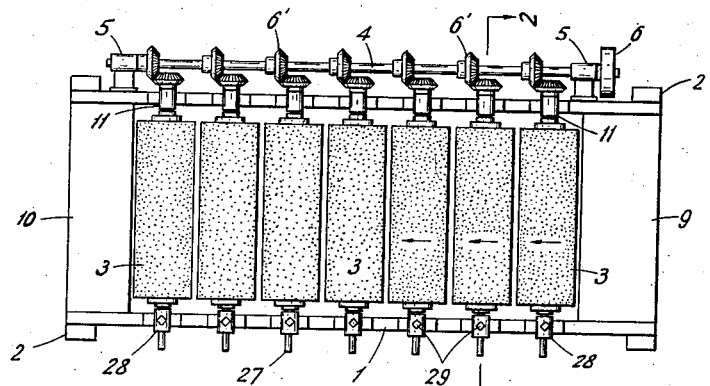
Figure 1 is a plan view of a brushing machine having the features of my invention incorporated therein.
Figure 2:
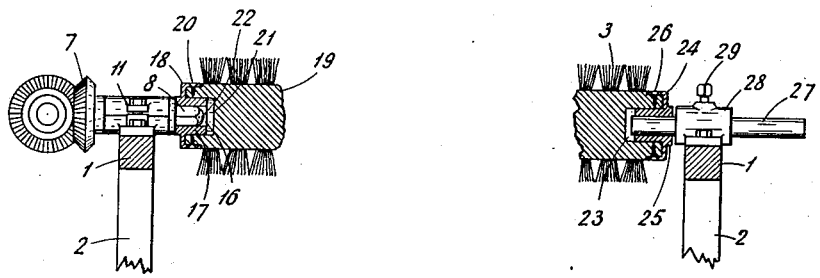
Figure 2 is a sectional view taken along the lines 2—2 of Figure 1.

Referring to Figure 1, the apparatus illustrated comprises a suitable supporting frame 1 provided with legs 2 and carrying a plurality of transversely disposed rotatable brushes 3, all of which are adapted to rotate in the same direction so that the fruit is advanced across the brushes transversely to their axes. The driving means for the brushes comprises a drive shaft 4 located to one side of the apparatus and mounted to rotate in bearings 5 secured to the frame 1. Power may be supplied to a suitable pulley 6 keyed to one end of the drive shaft. A plurality of bevel gears 6 are also keyed to the drive shaft and are adapted to mesh with corresponding gears 7 fixed to the outer ends of the stub shafts 8, which are adapted to drive the brushes 3 in a manner presently to be described. By this construction, when power is applied to the pulley 6 so that the brushes operate in the direction of the arrows, fruit to be cleaned or polished may be fed onto the brushes over a suitable ramp 9 so that as long as additional fruit continues to be fed it will be advanced transversely across the brushes and finally discharged therefrom over the discharge ramp 10.

Figure 3:
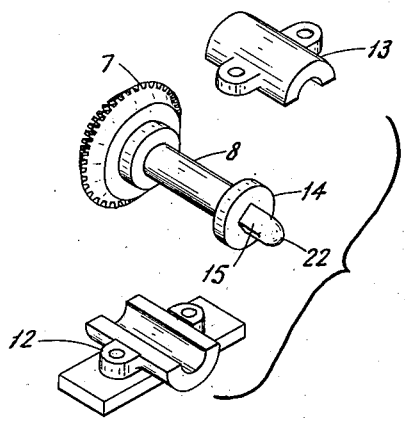
Figures 3 illustrates in detail the construction of the driving shaft and its support.
Figure 4:
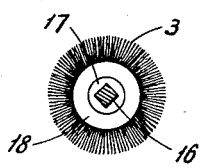
Figure 4 is a view of the driving end of one of the brushes illustrating the squared recess for the reception of the driving shaft.
Figure 5:
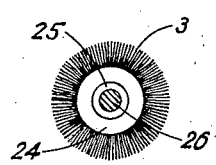
Figure 5 is a view of the opposite end of the brush.

Referring now to Figures 3 to 5 it will be seen that the stub shafts 8 which serve to drive the brushes 3 are carried by bearings 11 comprising the pillow blocks 12 and caps 13. To prevent lateral movement of the shafts, collars 14 are provided intermediate of their lengths and these are adapted to bear against the inner faces of the bearings 11 while the bevel gears 7 bear against their outer faces. The portion of the drive shafts 8 which rotates in the bearing is cylindrical as shown, but its inner end, which protrudes inwardly from the bearing 11, is squared, as at 15 so as to cooperate with a squared recess 16 provided in a bearing 17 carried by the collar or end cap 18 secured to the outer end of the core 19 of the brush 3 as by means of screws 20. Preferably, in order to provide adequate support, the bearing 17 is slightly extended in both directions from the face of the end cap 18, and to accommodate the inner extension the core 19 is provided with a suitable recess 21. The inner end of the shaft 8 is rounded off as indicated at 22 so that when the opposite end of the brush is free it may be lifted or lowered, the bearing in this case pivoting about the shaft 8.

The other end of the core 19 is recessed at 23 in the same manner as at 21 and is also provided with a collar or end cap 24 which is similar in all respects to the cap 18 except that its bearing 25 is provided with a round bearing surface instead of a square one. This bearing is suited to the reception of a cylindrical stub shaft 27, which is slidably mounted in a shaft support 28 so that it may be withdrawn at will to free the brush 3. The shaft 27 is somewhat elongated as shown, so as to extend outwardly of the shaft support, whereby it may readily be grasped for adjusting its position. A set screw 29 is provided in the shaft support 28 for securing the shaft in place and preventing its displacement due to accident or vibration.

It will now be seen that the construction just described allows for the ready removal of the brushes simply by loosening the set screw 29, whereupon the outwardly protruding portion of the shaft 27 may be grasped and the shaft withdrawn, thus freeing the brush end so that it can be lifted above the frame and withdrawn from the driving shaft 8. The distance between the extreme outer faces of the bearings 17 and 25 is slightly less than the distance between the inner faces of the shaft supports 11 and 28, thereby allowing sufficient play for the brushing roller, so that the end carrying the cap can be lifted without interference by the shaft support 28, the collar 17 pivoting about the rounded end of the shaft 8 until the brush is removed therefrom.

It will also be noted that the end caps 18 and 24 are readily removable from the brush core 19 upon the removal of the screws 20 and 26. By this construction the end caps need not be discarded with a defective brush but may be retained and applied to new brush cores for future use. This is a most desirable feature. As heretofore mentioned, the brush cores are ordinarily made of wood or the like, which is unsuitable for bearings or driving connections on account of undue rapid wear. For this reason the metallic end caps are provided and as these add to the expense of the brushes a material saving may be effected by using the sets of caps over and over again.

Although I have described my invention as applied to the brushing rollers of a fruit brushing machine, its use is not confined thereto but it is also applicable to other types of machines having other types of supporting means, such as, for example, conveyors having transversely disposed supporting rollers. It will also be seen that various changes and modifications may be made in the details of the apparatus shown without departing from the spirit of my invention, and I deem myself entitled to all such modifications and variations as fall within the scope of the claims appended hereto.

Having now described my invention and in what manner the same may be used, what I claim as new and desire to protect by Letters Patent is:

1. In an apparatus of the character described, a frame including spaced side rails, a pair of shaft supports carried thereby, a revoluble buffing element having a socket in one end thereof, means for driving said buffing element comprising a stub shaft rotatably secured in one of said supports and projecting into slidable and pivotal engagement with said socket to permit pivoting of the buffing element about the end of the stub shaft clear of the opposite side rail prior to complete withdrawal therefrom, and a second stub shaft slidably mounted in the other shaft support for engaging and supporting the opposite end of the buffing element.

2. In an apparatus of the character described, a frame including spaced side rails, a pair of shaft supports carried thereby, a revoluble buffing element having a socket in one end thereof, means for driving said buffing element comprising a stub shaft rotatably secured in one of said shaft supports and projecting into slidable and pivotal engagement with said socket to permit pivoting of the buffing element about the end of the stub shaft clear of the opposite side rail prior to complete withdrawal therefrom, a second stub shaft slidably mounted in the other shaft support for engaging and supporting the opposite end of the buffing element, and releasable means engageable with said last mentioned shaft for securing it against endwise movement, said shaft having a portion projecting outwardly of its support to provide a hand hold portion and being completely withdrawable from its support upon disengagement of the securing means.

3. In an apparatus of the character described, a frame including spaced side rails, a pair of shaft supports carried thereby, a revoluble buffing element having a socket in one end thereof, means for driving said buffing element comprising a stub shaft rotatably secured in one of said supports and projecting into slidable engagement with said socket and having its inner end rounded to permit pivoting of the buffing element about the end of the stub shaft clear of the opposite side rail prior to complete withdrawal therefrom, and a second stub shaft slidably mounted in the other support for engaging and supporting the opposite end of the buffing element.

4. In an apparatus of the character described, a frame including spaced side rails, a pair of shaft supports carried thereby, a revoluble buffing element having a socket in one end thereof, means for driving said buffing element comprising a stub shaft rotatably secured on one of said supports and projecting into slidable engagement with said socket and having its inner end rounded to permit pivoting of the buffing element about the end of the stub shaft clear of the opposite side rail prior to complete withdrawal therefrom, a second stub shaft slidably mounted in the other support for engaging and supporting the opposite end of the buffing element, and releasable means engageable with said last mentioned shaft for securing it against endwise movement, said shaft having a portion projecting outwardly of its support to provide a hand hold portion and being completely withdrawable from its support upon disengagement of the securing means.

5. In an apparatus of the character described, a frame including spaced side rails, a pair of shaft supports carried thereby, a revoluble buffing element having sockets in its opposite ends one of which is squared, means for driving said buffing element comprising a stub shaft rotatably secured in one of said supports and having a squared portion projecting into slidable engagement with said squared socket and having its inner end rounded to permit pivoting of the buffing element about the end of the stub shaft clear of the opposite side rail prior to complete withdrawal therefrom, and a second stub shaft slidably mounted in the other support and projecting into the other socket to support the opposite end of the buffing element.

6. In an apparatus of the character described, a frame including spaced side rails, a pair of shaft supports carried thereby, a revoluble buffing element having a squared socket in one end thereof, means for driving said buffing element comprising a stub shaft rotatably secured in one of said supports and having a squared portion projecting into slidable engagement with said squared socket and having its inner end rounded to permit pivoting of the buffing element about the end of the stub shaft clear of the opposite side rail prior to complete withdrawal therefrom, and a second stub shaft slidably mounted in the other shaft support for engaging and supporting the opposite end of the buffing element.

7. An apparatus of the character described including a frame, a pair of spaced shaft supports carried thereby, a revoluble buffing element, means for driving said buffing element comprising a stub shaft rotatably secured in one of said supports and having a free driving engagement with said buffing element whereby to permit swinging of the latter out of alignment with said shaft prior to complete disengagement therefrom, and a second stub shaft slidably mounted in the other shaft support for engaging and supporting the opposite end of the buffing element.

8. An apparatus of the character described including a frame, a pair of spaced shaft supports carried thereby, a revoluble buffing element, means for driving said buffing element comprising a stub shaft rotatably secured in one of said supports and having driving engagement with said buffing element, said buffing element being swingable about the end of said stub shaft prior to complete disengagement therefrom, and a second stub shaft slidably mounted in the other shaft support for engaging and supporting the opposite end of said buffing element.

LLOYD E. JONES.